(12) United States Patent
Shimizu et al.

(10) Patent No.: US 11,065,874 B2
(45) Date of Patent: Jul. 20, 2021

(54) METHOD OF MANUFACTURING A LIQUID EJECTION HEAD

(71) Applicant: CANON KABUSHIKI KAISHA, Tokyo (JP)

(72) Inventors: Naoko Shimizu, Kawasaki (JP); Yukuo Yamaguchi, Tokyo (JP); Mikiya Umeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/421,314

(22) Filed: May 23, 2019

(65) Prior Publication Data

US 2019/0366715 A1 Dec. 5, 2019

(30) Foreign Application Priority Data

May 29, 2018 (JP) .............................. JP2018-102831

(51) Int. Cl.
| | |
|---|---|
| B29C 45/14 | (2006.01) |
| B41J 2/14 | (2006.01) |
| B41J 2/16 | (2006.01) |
| B29C 45/16 | (2006.01) |
| B29L 31/00 | (2006.01) |

(52) U.S. Cl.
CPC ..... B41J 2/14201 (2013.01); B29C 45/14467 (2013.01); B29C 45/16 (2013.01); B29C 45/1635 (2013.01); B41J 2/1607 (2013.01); B41J 2/1637 (2013.01); B29L 2031/767 (2013.01); B41J 2002/14419 (2013.01); B41J 2202/22 (2013.01)

(58) Field of Classification Search
None
See application file for complete search history.

(56) References Cited

U.S. PATENT DOCUMENTS

| | | | | |
|---|---|---|---|---|
| 5,255,022 | A * | 10/1993 | Burolla | B29C 65/606 347/63 |
| 7,604,764 | B2 * | 10/2009 | Arai | B29C 45/0062 264/263 |
| 10,081,185 | B2 * | 9/2018 | Kimura | B41J 2/1623 |
| 10,300,643 | B2 * | 5/2019 | Tsujiuchi | B29C 45/33 |

(Continued)

FOREIGN PATENT DOCUMENTS

| | | |
|---|---|---|
| CN | 1572477 A | 2/2005 |
| CN | 105269964 A | 1/2016 |

(Continued)

*Primary Examiner* — Edmund H Lee
(74) *Attorney, Agent, or Firm* — Canon U.S.A., Inc., IP Division (57) ABSTRACT

A method of manufacturing a liquid ejection head including a first step of having a molten resin becoming a first portion flow in between a first position in a first mold and a first position in a second mold and the molten resin becoming a second portion flow in between a second position in the first mold and a second position in the second mold; a second step of relatively moving the first and second molds, after opening the molds; a third step of closing the molds; a fourth step of joining the first and second portions, a fifth step of taking out the first and second portions and the sealing portion from the molds and mounting a recording element substrate; and a step of forming a space portion between a liquid supply path surface and a mounting surface.

8 Claims, 11 Drawing Sheets

(56) References Cited

U.S. PATENT DOCUMENTS

| | | | |
|---|---|---|---|
| 10,471,719 B2* | 11/2019 | Toda | B41J 2/14024 |
| 10,906,221 B2* | 2/2021 | Tsujiuchi | B29C 45/34 |
| 10,926,441 B2* | 2/2021 | Tsujiuchi | B29C 45/0025 |
| 2010/0171798 A1* | 7/2010 | Yamaguchi | B41J 2/17513 347/85 |
| 2014/0071199 A1* | 3/2014 | Tajima | B41J 2/1637 347/29 |
| 2016/0346976 A1* | 12/2016 | Tsujiuchi | B29C 45/0416 |
| 2016/0347072 A1* | 12/2016 | Iwano | B41J 2/175 |
| 2018/0029266 A1* | 2/2018 | Tsujiuchi | B41J 2/17523 |
| 2018/0029267 A1* | 2/2018 | Tsujiuchi | B41J 2/1753 |

FOREIGN PATENT DOCUMENTS

| | | | |
|---|---|---|---|
| CN | 106182556 A | | 12/2016 |
| CN | 106183427 A | | 12/2016 |
| JP | 2007-331320 A | | 12/2007 |
| JP | 2007331320 | * | 12/2007 |
| JP | 2010158806 A | | 7/2010 |
| JP | 2012192749 A | | 10/2012 |
| JP | 2015226988 A | | 12/2015 |
| JP | 2016215627 A | | 12/2016 |
| JP | 2018016026 A | | 2/2018 |
| WO | 9838021 A1 | | 9/1998 |

* cited by examiner

METHOD OF MANUFACTURING A LIQUID EJECTION HEAD

BACKGROUND OF THE INVENTION

Field of the Invention

The present disclosure relates to a liquid ejection head and a method of manufacturing the same.

Description of the Related Art

As an example of a configuration of a liquid ejection head, a configuration including a recording element unit on which a recording element substrate that ejects liquid is mounted, and a liquid flow path member including a liquid supply path that supplies a liquid supplied from a liquid container and the like to a recording element substrate is known. A method and the like in which an elastic member such as a rubber member or the like is interposed between a recording element unit and the liquid flow path member and in which the recording element unit and the liquid flow path member are screwed together with screws is described in Japanese Patent Laid-Open No. 2015-226988 as a method of increasing the seal characteristics between the recording element unit and the liquid flow path member.

SUMMARY OF THE INVENTION

An aspect of the present disclosure is a method of manufacturing a liquid ejection head including a recording element substrate that ejects a liquid, and a liquid flow path member that includes a liquid supply path that supplies the liquid to the recording element substrate, in which the liquid flow path member includes a first portion that forms a portion of the liquid supply path, a second portion that includes a liquid supply path surface that forms another portion of the liquid supply path and a mounting surface on which the recording element substrate is mounted, and a sealing portion that seals an adjacent portion of the liquid supply path, the method of manufacturing the liquid ejection head comprising: a first step of having a molten resin that is to become the first portion flow in between a first position in a first mold and a first position in a second mold and having the molten resin that is to become the second portion flow in between a second position in the first mold and a second position in the second mold; a second step of relatively moving the first mold and the second mold so that the first portion of the first mold and the second portion of the second mold oppose each other, after opening the first mold and the second mold so that the first portion remains at the first position in the first mold and so that the second portion remains at the second position in the second mold; a third step of closing the first mold and the second mold so that an area around a portion that is to become the liquid supply path in the first portion and an area around a portion that is to become the liquid supply path in the second portion contact each other, a fourth step of joining the first portion and the second portion by having a molten resin that is to become the sealing portion flow into the adjacent portion of the area around the portion that is to become the liquid supply path in the first portion and the area around the portion that is to become the liquid supply path in the second portion; a fifth step of taking out the first portion, the second portion, and the sealing portion from the first mold and the second mold and mounting the recording element substrate on the mounting surface; and a step of forming a space portion between the liquid supply path surface and the mounting surface.

Furthermore, another aspect of the present disclosure is a liquid ejection head including a recording element substrate that ejects a liquid, and a liquid flow path member that includes a liquid supply path that supplies the liquid to the recording element substrate. The liquid flow path member includes a first portion that forms a portion of the liquid supply path, a second portion that includes a liquid flow path surface that forms another portion of the liquid flow path and a mounting surface on which the recording element substrate is mounted, and a sealing portion that seals a contact portion between an area adjacent to a portion in which the liquid flow path is formed in the first portion and an area adjacent to a portion in which the liquid flow path is formed in the second portion. In the liquid ejection head, the first portion, the second portion, and the sealing portion each include a resin, at least portions of the first portion and the sealing portion are mixed with each other, at least portions of the second portion and the sealing portion are mixed with each other, and a space portion is situated between the liquid supply path surface and the mounting surface.

Further features of the present disclosure will become apparent from the following description of exemplary embodiments with reference to the attached drawings.

BRIEF DESCRIPTION OF THE DRAWINGS

FIG. 11A to 11C are cross-sectional views illustrating the slide pieces in the third and fourth steps in the manufacturing of the liquid flow path member.

DESCRIPTION OF THE EMBODIMENTS

However, in the method of screwing with the elastic member interposed in between, there are cases in which the recording element unit or the liquid flow path member becomes deformed by the reactive force of the elastic member and the dimensional accuracy of the above members becomes affected.

The present disclosure provides a liquid ejection head having a high dimensional accuracy and a method of manufacturing the liquid ejection head.

Hereinafter, a liquid ejection head and a method of manufacturing the liquid ejection head according to an example embodiment of the present disclosure will be described with reference to the drawings.

Regarding Liquid Ejection Head

Figure 1A:
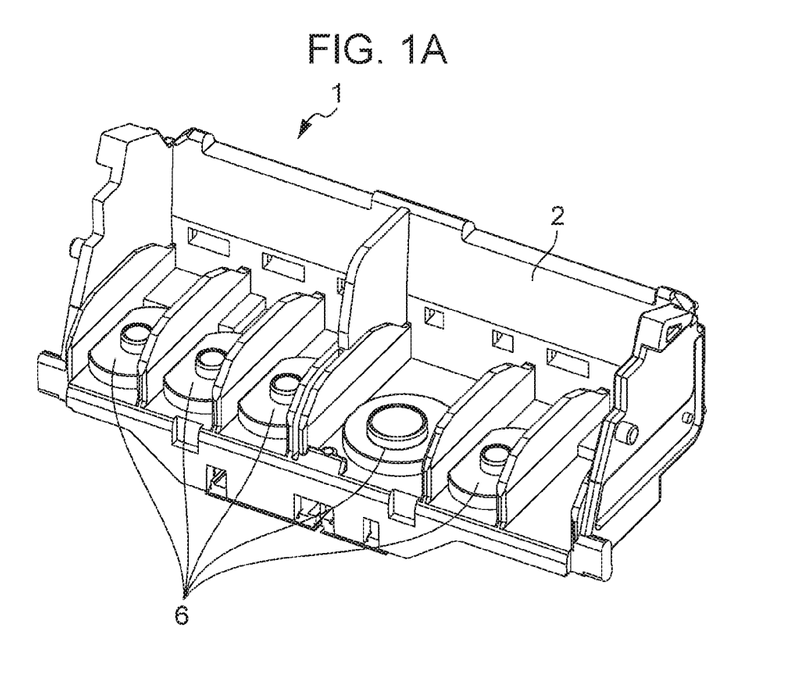
FIG. 1A is a perspective view of a liquid ejection head.
Figure 1B:
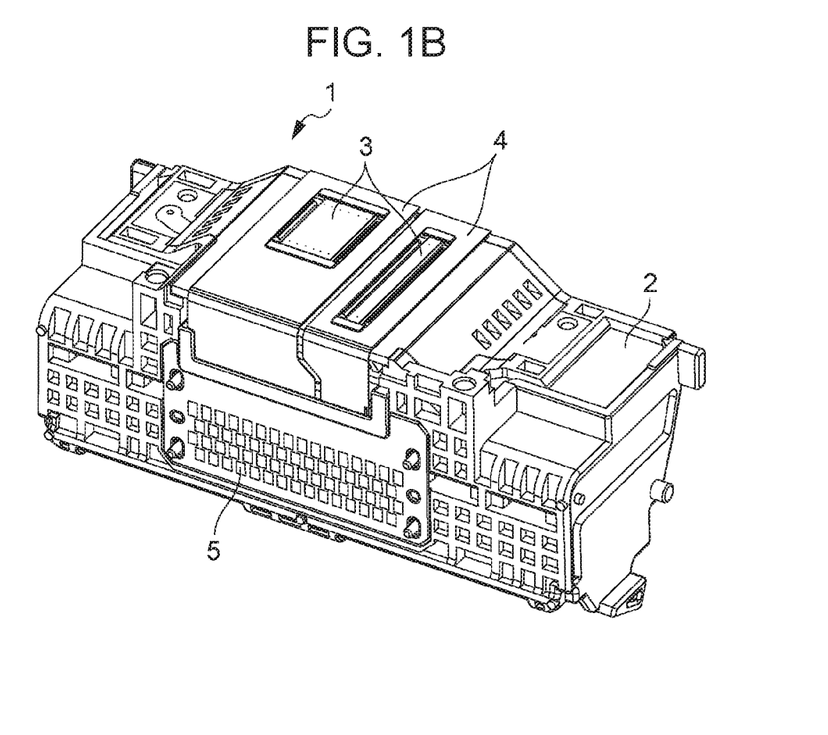
FIG. 1B is a perspective view of the liquid ejection head viewed from a recording element substrate side.

A liquid ejection head according to an example embodiment will be described. FIGS. 1A and 1B are perspective views illustrating a liquid ejection head 1 according to the example embodiment. FIG. 1A is a perspective view of the liquid ejection head 1 viewed from a side on which liquid containers (not shown) that contain liquids are installed in the liquid ejection head 1. FIG. 1B is a perspective view of the liquid ejection head 1 viewed from a side of recording element substrates 3 that eject liquid.

The liquid ejection head 1 includes a liquid flow path member 2, the recording element substrates 3 that eject the liquid, electric wiring substrates 4, and electric connection substrates 5. The liquid flow path member 2 is a member that supplies the liquid supplied from the liquid containers to the recording element substrates 3. In the present example embodiment, the liquid flow path member also functions as a mount portion (a liquid container holder) in which the liquid containers are mounted. The electric wiring substrates 4 are members that supply electric power to pressure generating elements (not shown) of the recording element substrates 3, and in the present example embodiment, the electric wiring substrates 4 use wiring substrates each configured of a flexible film. The electric connection substrates 5 are members that electrically connect the liquid ejection head 1 and an external portions (not shown, a main body of the liquid ejection apparatus, for example). Note that an electrical connection with the external portions may be established without using the electric connection substrates 5 and by providing electric contacts in the electric wiring substrates 4. In the present example embodiment, a total of five types of liquids are supplied to the recording element substrates 3 through five joint portions 6 corresponding to five liquid containers.

A plurality of ejection port arrays 10 (FIG. 2) each including a plurality of ejection ports (not shown), which eject the liquid, arranged in a row are disposed in each recording element substrate 3. Each ejection port is provided with a heating element (not shown) serving as an energy generating element that generates energy to eject the liquid. A piezoelectric element or the like is also applicable as the energy generating element. By driving the energy generating elements from a liquid ejection apparatus (not shown) through the electric connection substrates 5 and the electric wiring substrates 4, the liquid is ejected from the ejection ports of the ejection port arrays corresponding to the joint portions 6.

Regarding Liquid Flow Path Member

Figure 2:
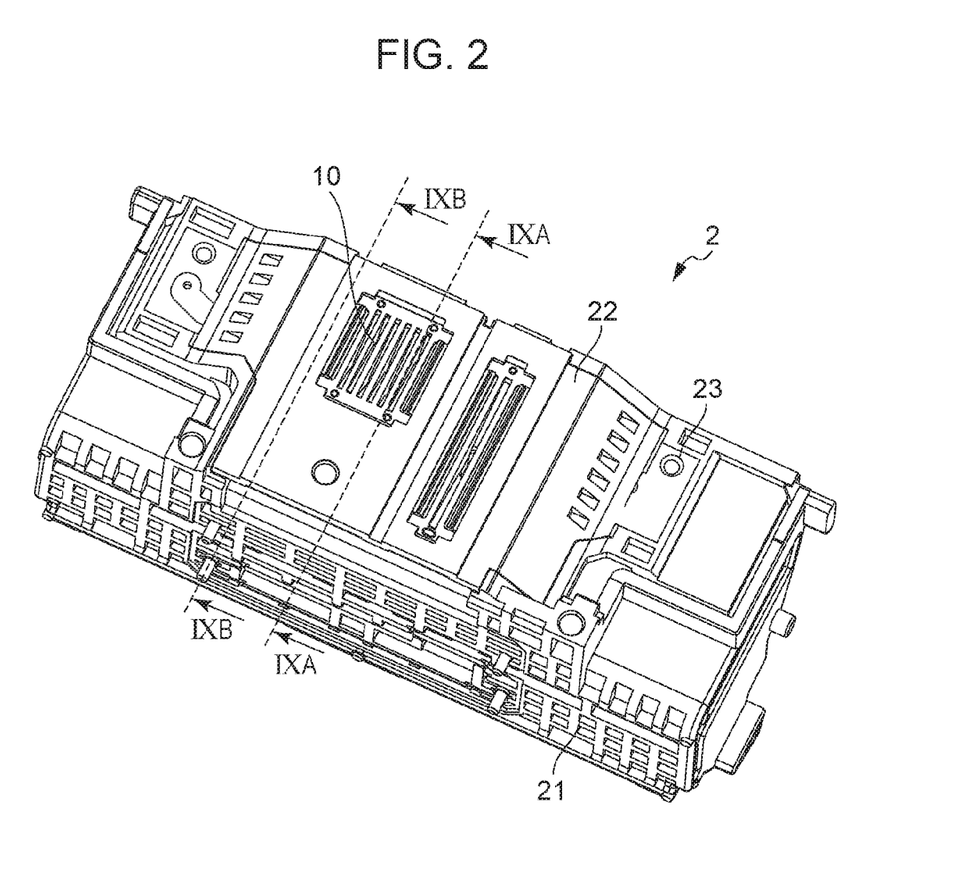
FIG. 2 is a perspective view illustrating a liquid flow path member.

The liquid flow path member 2 which is a featured portion of the present example embodiment will be described with reference to FIGS. 2 to 5. FIG. 2 is a perspective view illustrating the liquid flow path member 2. As illustrated in FIG. 2, the liquid flow path member 2 includes a first portion 21, a second portion 22, and a sealing portion 23, and is a resin member in which the above members are integrally formed in a series of forming steps described later.

Figure 3:
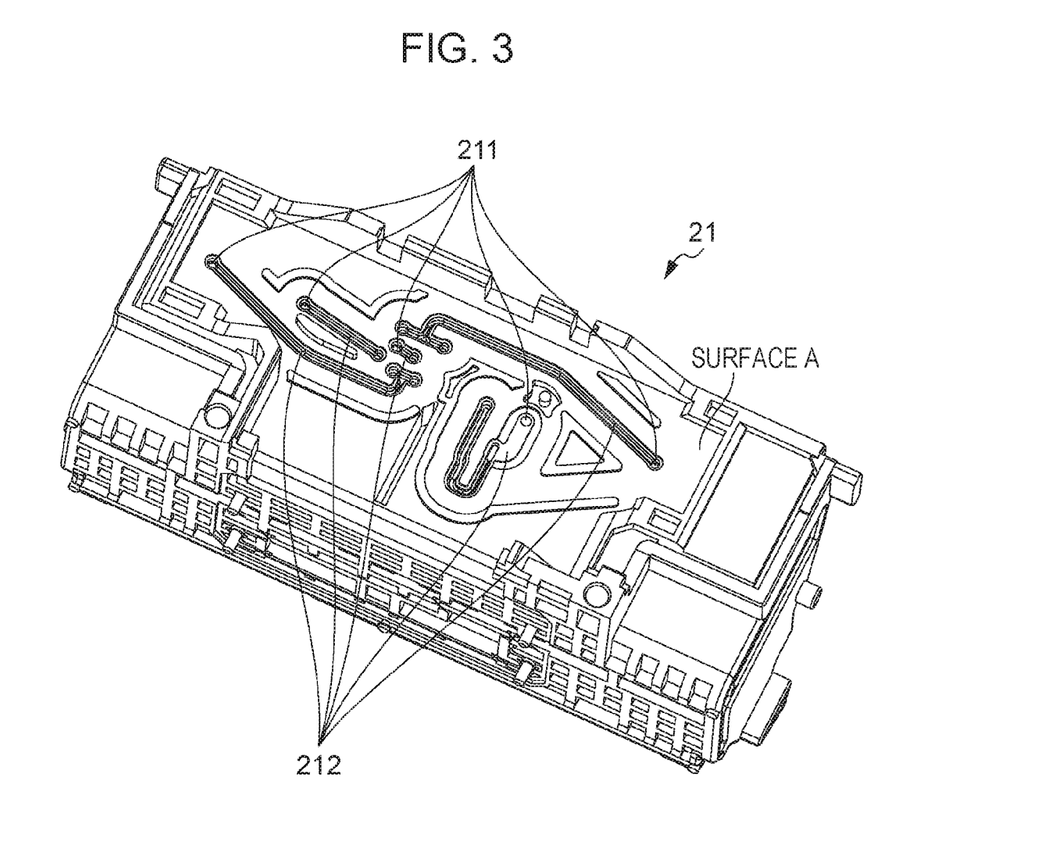
FIG. 3 is a perspective view illustrating a first portion of the liquid flow path member.
Figure 4A:
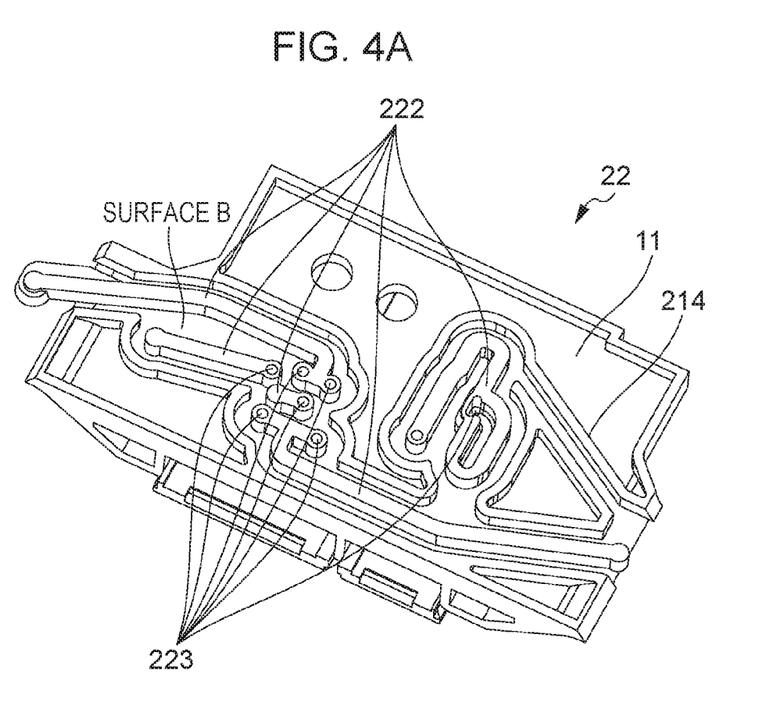
FIG. 4A is a perspective view of a second portion of the liquid flow path member.

FIG. 3 is a perspective view illustrating the first portion 21 of the liquid flow path member 2. As illustrated in FIG. 3, the first portion 21 includes liquid inlet ports 211 and flow path grooves 212, and the flow path grooves 212 form portions of a liquid supply path. Note that the liquid supply path is a flow path formed between contact surfaces of the first portion 21 and the second portion 22, and is a flow path portion that supplies the liquid from the liquid inlet ports 211 to the perpendicular flow paths 223 (FIG. 4A). The flow path grooves 212 each have a recessed shape. The liquid inlet ports 211 are through-holes that penetrate from the five joint portions 6 to the surface A side in a substantially perpendicular direction and are in communication with the flow path grooves 212. The flow path grooves 212 are disposed so as to supply a liquid from the liquid inlet ports 211 to the lower portions of the ejection port arrays 10, each array corresponding to one of the liquids of various types, included in the recording element substrates 3. Areas in which the recording element substrates 3 are provided are significantly smaller than areas in which the five joint portions 6 are provided. Accordingly, the liquid is collected (converged) with the liquid supply path from the positions where the joint portions 6 are situated to the areas of the recording element substrates 3. Accordingly, intervals at which the adjacent liquid supply ports 226 are disposed are smaller than intervals at which the adjacent joint portions are disposed. Furthermore, even in a liquid ejection head corresponding to a plurality of colors of ink, each liquid can be collected (converged) to the areas of the recording element substrates 3 by configuring the intervals at which the liquid supply ports 226 of the plurality of liquid supply paths corresponding to the plurality of colors are disposed smaller than the intervals at which the adjacent joint portions are disposed.

Figure 4B:
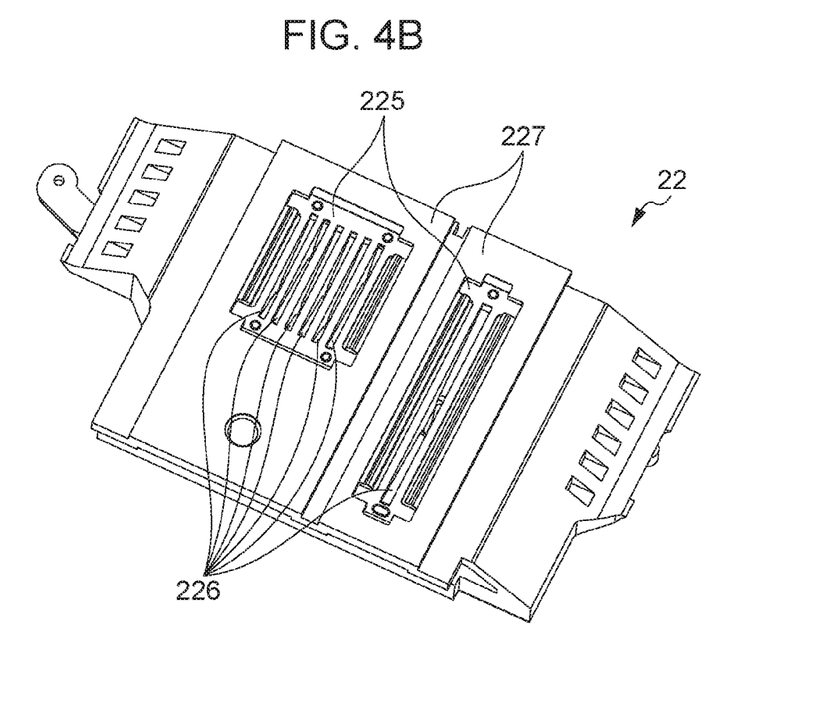
FIG. 4B is a perspective view of the second portion of the liquid flow path member viewed from the side on which the recording element substrates are mounted.

FIGS. 4A and 4B are perspective views illustrating the second portion 22 of the liquid flow path member 2. FIG. 4A is a perspective view of the side in contact with the surface A of the first portion 21, and FIG. 4B is a perspective view of the side on which the recording element substrates 3 are mounted. As illustrated in FIG. 4A, flow path covers 222 having protruded shapes at portions corresponding to the flow path grooves 212 is disposed on a liquid supply path surface 11 in contact with the surface A. The flow path covers 222 form portions of the liquid supply path and, as described later, the liquid supply path is formed by having the first portion 21 and the second portion 22 contact each other. In other words, one member forming the liquid supply path has recessed shapes and the other member has protruded shapes. The flow path covers 222 have widths sufficient enough to cover upper surfaces of the flow path grooves 212, and the liquid supply path is formed by having the flow path covers 222 contact the upper surfaces of the flow path grooves 212. Perpendicular flow paths 223 that guide the liquid to the recording element substrates 3 are formed on the other end side, which is a side of the flow path cover 222 opposite to the side corresponding to the joint portions 6. Walls 214 are provided around the flow path covers 222 to define (partition) areas in which molten resin forming the sealing portion 23 (FIG. 5) described later flows.

As illustrated in FIG. 4B, the liquid supply ports 226 that are in communication with the perpendicular flow paths 223 and that supply the liquid to the ejection port arrays are provided in the mounting surfaces 225 on which the recording element substrates 3 are mounted. The perpendicular flow paths 223 each include a tapered flow path portion that becomes larger in an ejection port array direction as the tapered flow path portion extends downstream. The dimension of each liquid supply port 226 in the ejection port array direction is equal to or larger than the length of each ejection port array. Accordingly, the liquid supplied from the liquid containers flows in the order of the joint portions 6 of the liquid flow path member 2, the liquid inlet ports 211, liquid supply paths 12 (FIG. 7), the perpendicular flow paths 223, and the liquid supply ports 226, and is supplied to the recording element substrates 3. Furthermore, an electric wiring substrate surface 227 on which the electric wiring substrates 4 are mounted is provided on a mounting surface side of the second portion 22 on which the recording element substrates 3 are mounted.

Figure 5:
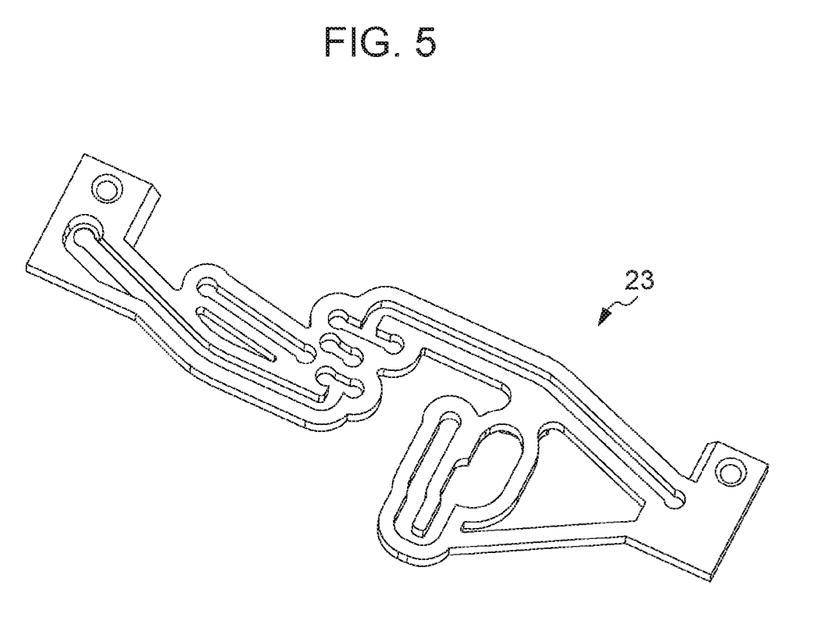
FIG. 5 is a perspective view illustrating a sealing portion of the liquid flow path member.

FIG. 5 is a perspective view illustrating the sealing portion 23 described later. The sealing portion 23 is formed by having the molten resin flow in an area defined by the surface A of the first portion 21, the flow path covers 222 of the second portion 22, the walls 214, and a surface B illustrated in FIG. 4A.

Regarding Method of Manufacturing

Figure 6A:
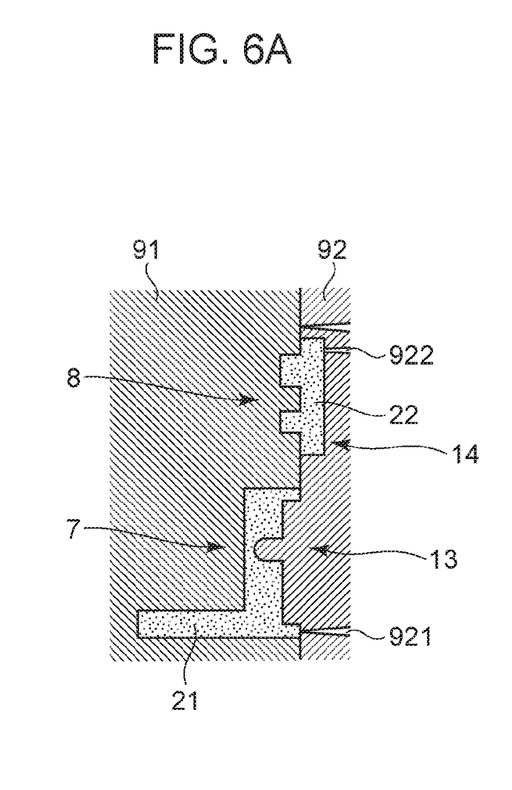
FIG. 6A is a schematic view illustrating a first step in the manufacturing of the liquid flow path member.
Figure 6B:
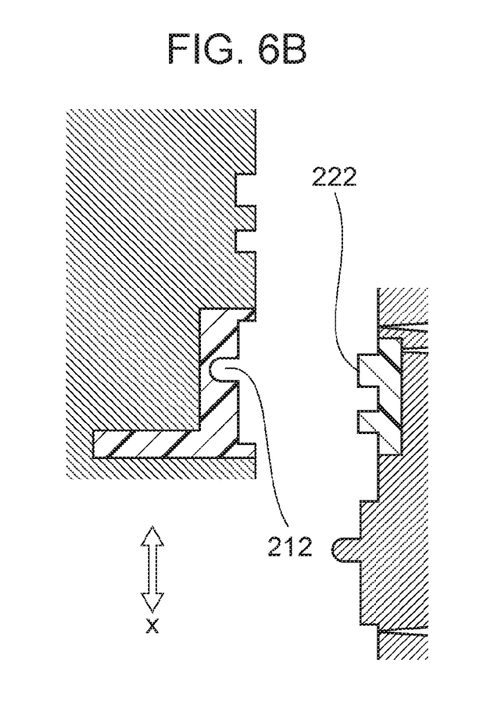
FIG. 6B is a schematic view illustrating a second step.
Figure 7A:
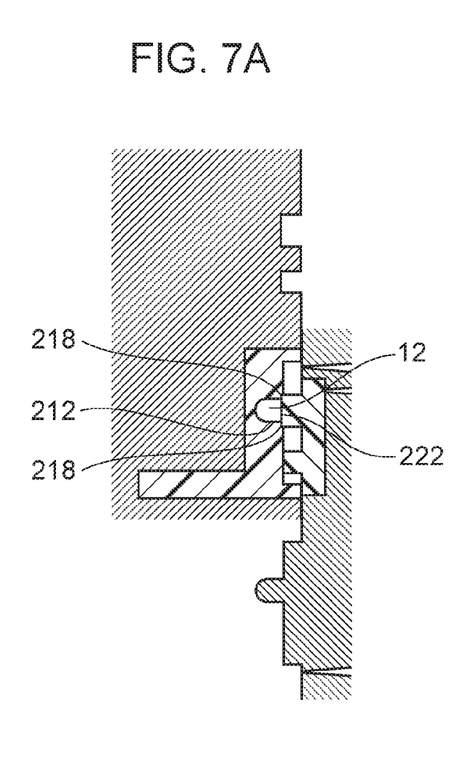
FIG. 7A is a schematic view illustrating a third step in the manufacturing of the liquid flow path member.
Figure 7B:
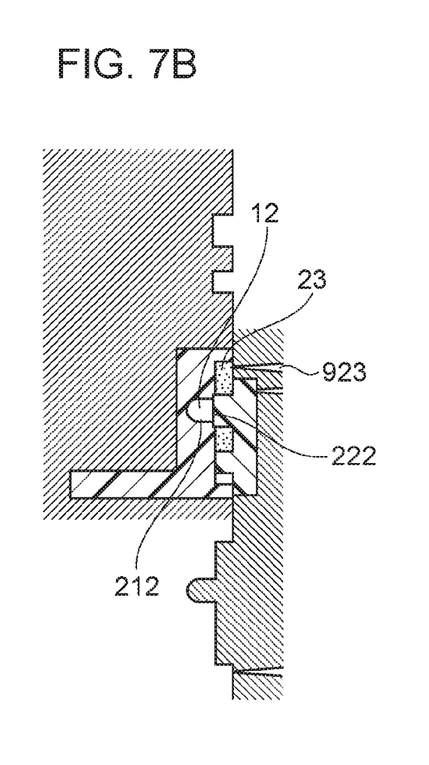
FIG. 7B is a schematic view illustrating a fourth step.
Figure 7C:
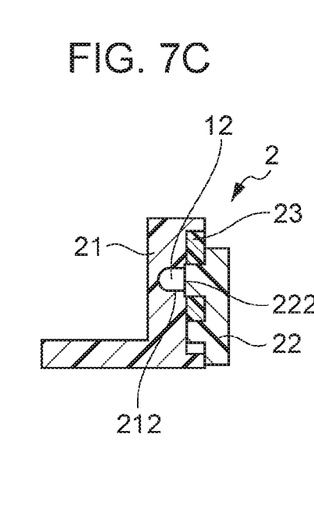
FIG. 7C is a schematic view illustrating a cross section of the liquid flow path member that has been taken out from molds after the fourth step.

A method of manufacturing the liquid flow path member 2 will be described. FIGS. 6A and 6B and FIGS. 7A to 7C are schematic views illustrating the method of manufacturing the liquid flow path member 2 according to the example embodiment. A so-called die slide injection molding is used as the method of manufacturing the liquid flow path member 2. The die slide injection molding mainly includes four steps. Of the four steps, a schematic view of a first step, which is the step performed first, is illustrated in FIG. 6A, and a schematic view of a second step, which is the step performed second, is illustrated in FIG. 6B, a schematic view of the third step, which is the step performed third, is illustrated in FIG. 7A, and a schematic view of a fourth step, which is performed last, is illustrated in FIG. 7B. Furthermore, FIG. 7C is a schematic view illustrating a cross section of the liquid flow path member 2 that has been taken out from a mold after the fourth step.

As illustrated in FIG. 6A, the first portion 21 and the second portion 22 are formed by injecting the molten resin into a first mold 91 and a second mold 92 (the first step). The first portion 21 is formed between a first position 7 in the first mold 91 and a first position 13 in the second mold 92. The second portion 22 is formed between a second position 8 in the first mold 91 and a second position 14 in the second mold 92. The molten resin injected into the mold is supplied into the mold through gates 921 and 922 provided in the second mold 92. The first mold 91 is capable of moving relative to the second mold 92. In other words, the first mold is capable of sliding in an arrow X direction illustrated in FIG. 6B. Furthermore, the first mold 91 and the second mold 92 can also be moved in a mold closing direction and a mold opening direction with a moving mechanism (not shown).

Subsequently, the first mold 91 and the second mold 92 are opened and the first mold 91 holding the first portion 21 is slid in the arrow X direction. Subsequently, the first portion 21 is made to oppose the second portion 22 held by the second mold 92 (the second step). In so doing, the first mold 91 is slid so that the flow path grooves 212 of the first portion 21 and the flow path covers 222 of the second portion are at positions opposing each other (FIG. 6B).

Subsequently, as illustrated in FIG. 7A, the first mold 91 and the second mold 92 are closed once again and portions 218 surrounding the peripheries of the flow path grooves 212 and the portions surrounding the peripheries of the flow path covers 222 are made to come in contact with each other (the third step). The areas surrounded by the flow path covers 222 and the flow path grooves 212 in the above manner are the liquid supply paths 12.

Subsequently, as illustrated in FIG. 7B, the molten resin is poured into the areas surrounding the liquid supply paths 12 to form the sealing portion 23 (the fourth step). By forming the sealing portion 23, the areas adjacent to the portions where the liquid supply paths of the first portion are formed and the areas adjacent to the portions where the liquid supply paths of the second portion are formed can be sealed. The molten resin forming the sealing portion 23 is supplied through a gate 923 provided in the second mold 92. By having the molten resin and the first portion 21 melt into each other and become solidified, the first portion 21 and the sealing portion 23 become joined to each other. Furthermore, by having the supplied molten resin and the second portion 22 melt into each other and become solidified, the second portion 22 and the sealing portion 23 become joined to each other and, as illustrated in FIG. 7C, the liquid flow path member 2 in which the above are integrated is formed. Subsequently, the liquid flow path member 2 constituted by the first portion 21, the second portion 22, and the sealing portion 23 is taken out from the first mold 91 and the second mold 92, and the recording element substrates 3 are mounted on the mounting surfaces 225 (FIG. 4B)(the fifth step). Note that while in the second step, the first mold 91 is moved relative to the second mold 92, the first mold 91 may be fixed and the second mold 92 may be moved, or both of the above may be moved. Furthermore, while the first mold 91 holds the first portion 21 in the second step, the first mold 91 may hold the second portion 22 and the second mold 92 may hold the first portion 21.

In the present disclosure, since the first portion 21 and the second portion 22 can be joined to each other without using any screws or the like by forming the sealing portion 23, a liquid ejection head with high dimensional accuracy can be provided. Furthermore, when the joining portion is sealed with an adhesive agent or the like, there are cases in which the liquid contact property of the adhesive agent with the ejected liquid becomes a problem. In the present example embodiment, since the joining portion is sealed with the sealing portion 23, a liquid ejection head with an excellent liquid contact property can be provided.

In the example embodiment, the same material is used as the molten resin that becomes the first portion 21 and the second portion 22. The above is, for example, a liquid crystal polymer, polyphenylene sulfide, polysulfone, polyphenylene ether, and a polymer alloy of the above. Furthermore, the composite material in which an inorganic filler such as silica fine particles, fiber, or the like is added to the above material as a base may be used. By using the composite material in the first portion 21 or the second portion 22, an effect that the strength of the above portion increases is obtained. Different materials may be used in the molten resins that become the first portion 21 and the second portion 22.

Figure 8:
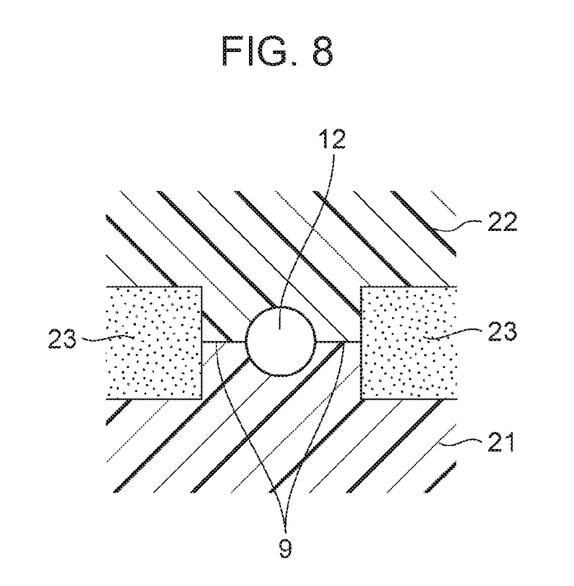
FIG. 8 is a schematic view illustrating the first portion and the second portion each having a recessed portion.

While it is desirable that the material of the molten resin that forms the sealing portion 23 and the materials of the first portion 21 and the second portion 22 are the same, as long as the material of the molten resin is mixed with the materials of the first portion 21 and the second portion 22, the material of the molten resin may be different from those of the first portion 21 and the second portion 22. A schematic diagram in which the sealing portion 23 is, for descriptions sake, solely taken out from the liquid flow path member 2 is illustrated in FIG. 5. However, in the actual state after the molding, there are portions in the boundaries between the sealing portion 23, and the first portion and the second portion where the resins have become mixed with each other and the boundaries are not clear. Furthermore, as illustrated in FIG. 8, the first portion 21 and the second portion 22 may each have a recessed portion and the liquid supply path 12 may be formed by abutting the recessed portions against each other.

Regarding Space Portions

Figure 9A:
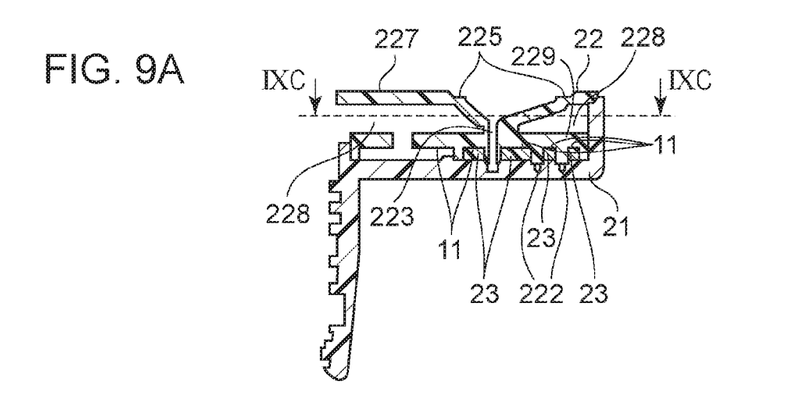
FIG. 9A is a cross-sectional view illustrating a space portion of the liquid flow path member taken along line IXA-IXA in FIG. 2.
Figure 9B:
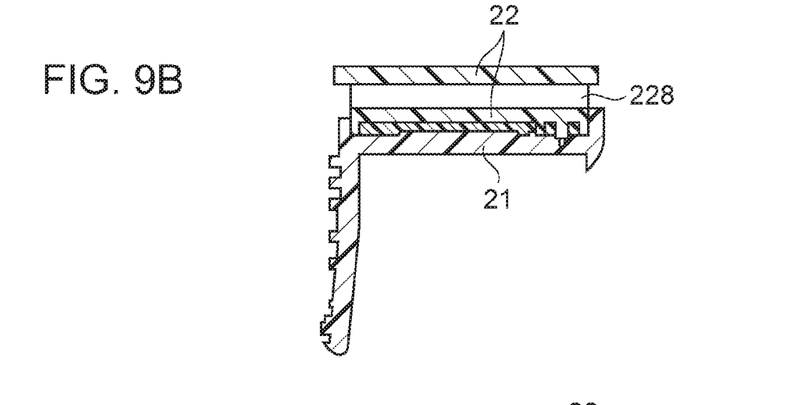
FIG. 9B is a cross-sectional view illustrating the space portion of the liquid flow path member taken along line IXB-IXB in FIG. 2.
Figure 9C:
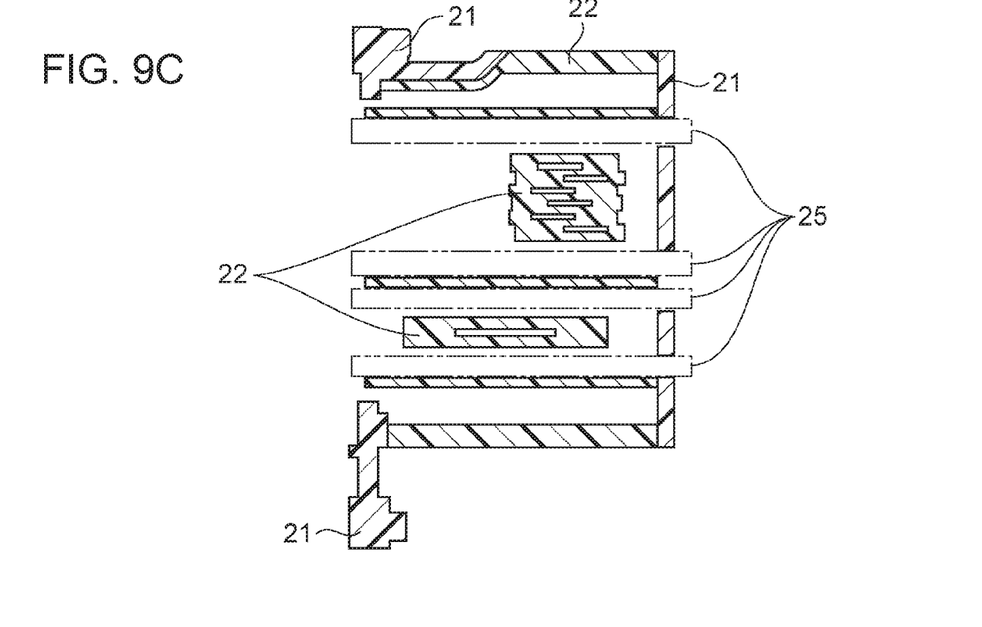
FIG. 9C is a cross-sectional view illustrating a cross section taken along line IXC-IXC in FIG. 9A.

As illustrated in FIGS. 9A and 9B, in the present example embodiment, a space portion 228 is formed in the second portion 22 between the mounting surface 225 on which the recording element substrate is mounted and the surface on the opposite side on which the flow path cover 222 is formed; accordingly a high dimensional accuracy is achieved in the mounting surface 225 on which the recording element substrate 3 is mounted. Referring to FIGS. 9A to 9C, a detailed configuration of the second portion 22 will be described. FIGS. 9A and 9B are schematic views illustrating a cross section taken along line IVA-IVA and IVB-IVB, respectively, in FIG. 2, and FIG. 9C is a schematic view illustrating a cross section taken along line IVC-IVC in FIG. 9A. As illustrated in FIG. 9A, the perpendicular flow path 223 has a shape that becomes larger towards the mounting surface 225 and in the longitudinal direction of the ejection port array 10. The space portion 228 is provided in the second portion 22 between the mounting surface 225 of the recording element substrate 3 and the liquid supply path surface 11 and in a portion other than where the perpendicular flow paths 223 are formed. As illustrated in FIG. 9B, in the portion where the perpendicular flow paths 223 are not disposed, the mounting surface 225 side and the side opposite the mounting surface 225 side are totally divided from each other with the space portion 228. Furthermore, as illustrated in FIG. 9C, through-hole portions 25 that penetrate the first portion 21 and the second portion 22 in a linear manner in one direction from the left end to the right end of the drawing are provided in portions of the space portion 228.

Figure 10A:
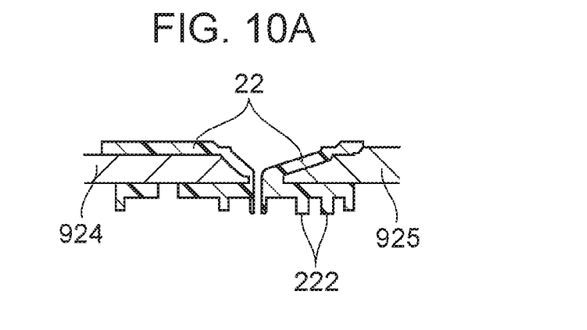
FIG. 10A is a schematic view illustrating slide pieces in FIG. 9A in the first step.
Figure 10B:
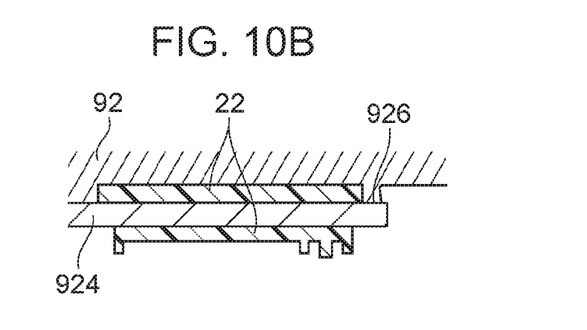
FIG. 10B is a schematic view illustrating the slide piece in FIG. 9B in the first step.
Figure 10C:
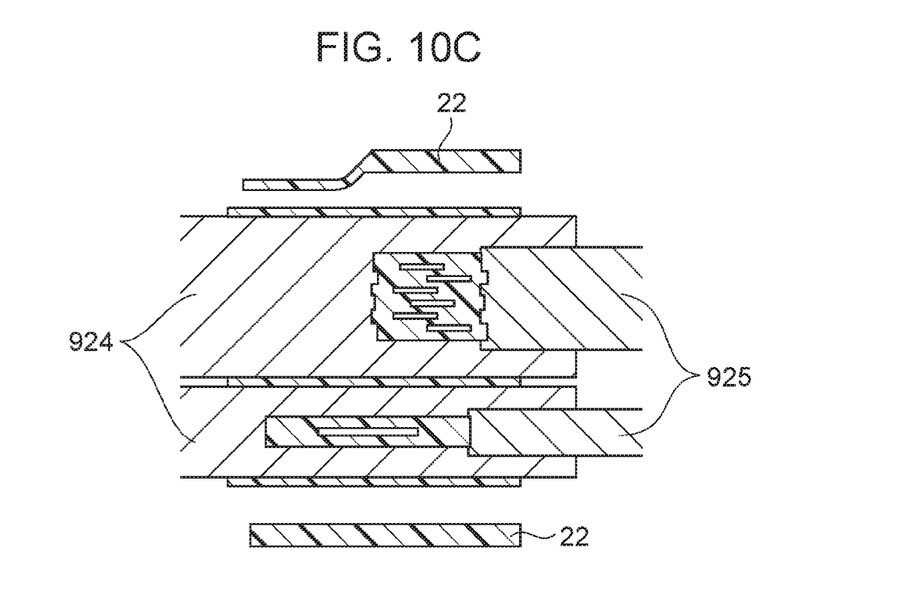
FIG. 10C is a schematic view illustrating the slide pieces in FIG. 9C in the first step.
Figure 11A:
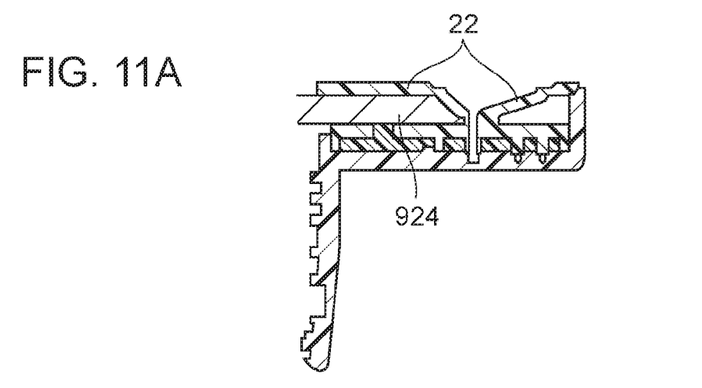
FIG. 11A is a schematic view illustrating the slide pieces in FIG. 9A in the third and fourth steps.
Figure 11B:
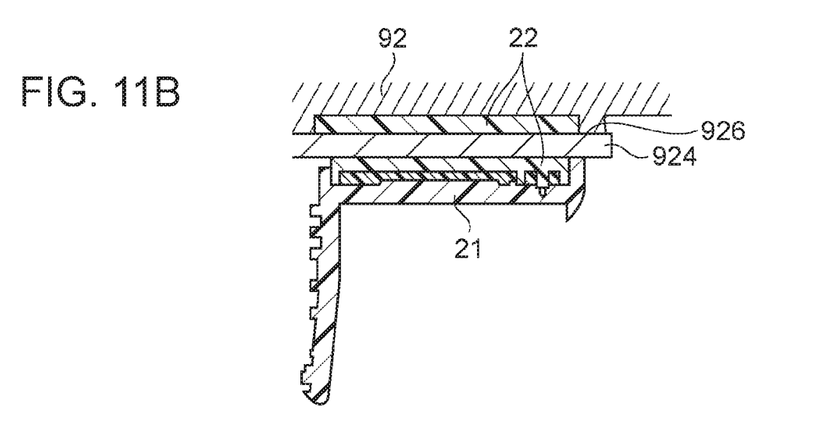
FIG. 11B is a schematic view illustrating the slide piece in FIG. 9B in the third and fourth steps.
Figure 11C:
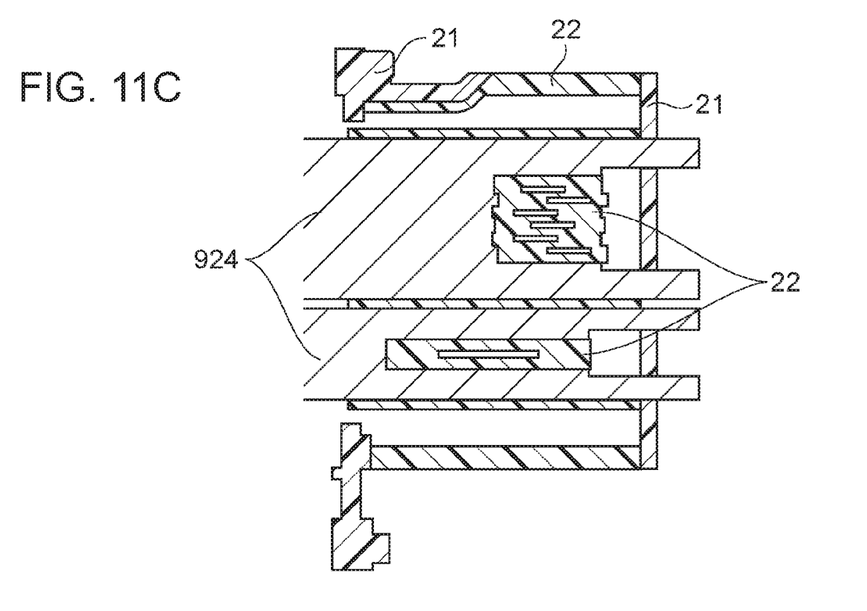
FIG. 11C is a schematic view illustrating the slide pieces in FIG. 9C in the third and fourth steps.

A first slide piece 924 and a second slide piece 925 attached to the mold 92 are used to form the space portion 228. FIGS. 10A, 10B, and 10C are schematic views each illustrating the slide pieces of FIGS. 9A, 9B, and 9C in the first step. FIGS. 11A, 11B, and 11C are schematic views each illustrating the slide pieces of FIGS. 9A, 9B, and 9C in the third and fourth steps.

As illustrated in FIGS. 10A, 10B, and 10C, the first slide piece 924 is shaped so as to fill the entire area of the through-hole portions 25 and one side of the space portion 228 separated by the perpendicular flow paths 223. The second slide piece 925 is shaped so as to fill, among the space portions separated by the perpendicular flow paths 223, the space portion 228 on the side opposite to the side on which the first slide piece 924 is inserted. In the first step, the first slide piece 924 is slid on the mold 92 from the left direction in FIG. 9A and the second slide piece 925 is slid from the right direction to dispose the first slide piece 924 and the second slide piece 925 at positions where the space portion 228 is expected to be formed; accordingly, the space portion 228 is formed during injection molding the second portion. When opening the molds 91 and 92 in the second step, the second slide piece 925 is slid in a direction opposite to that in the first step to retract the second slide piece 925 from the space portion 228. In so doing, the first slide piece 924 remains at the position that is the same as that in the first step. As illustrated in FIGS. 11A to 11C, in the third step and the fourth step, the first slide piece 924 remains at the position that is the same as that in the first and second steps, and the second slide piece 925 remains, as in the second step, retracted from the space portion 228. The first slide piece 924 penetrates through the through-hole portions 25 and, as illustrated in FIG. 10B and FIG. 11B, the distal end portion of the slide piece is received by support portion 926 provided in the mold 92. Furthermore, in order to facilitate sliding of the slide piece when the molds are opened, a taper (not shown) is provided from the openings of the through-hole portions 25 towards the inside of the space portion.

Hereinafter, the effect of providing the space portion 228 will be described. In the step of forming the liquid flow path member 2 in the present example embodiment, the molten resin that is to become the sealing portion 23 is supplied in the fourth step before the inner portions of the first portion and the second portion formed in the first step become cooled. Since the molten resin flows in the area surrounded by the first portion 21 and the second portion 22 formed of resin, compared with ordinary forming in which the molten resin flows in a portion surrounded by the mold, the molten resin is not easily cooled. Accordingly, the first portion 21 and the second portion 22 are heated by the heat of the molten resin and are in a softened state. When the molds are opened while the temperature of the sealing portion 23 is high and the first and second portions are soft, the sealing portion 23 shrinks when the sealing portion 23 is cooled and, affected by the above, there are cases in which the first or second portion becomes deformed. In order to reduce such deformation, there are methods such as increasing the cooling time after forming the first portion and the second portion or lowering the temperature of the molten resin; however, with such methods, there will be a limitation in the process such as the tact becoming longer and a decrease in the fluidity of the resin.

Accordingly, a heat insulating effect is produced by providing the space portion 228 as in the present example embodiment such that in the fourth step, the heat of the molten resin is not easily transmitted to the mounting surfaces 225 on which the recording element substrates 3 are mounted and to the electric wiring substrate surface 227. With the above, deformation of the mounting surfaces 225 of the recording element substrates 3 and the electric wiring substrate surface 227, which requires high dimensional accuracy, can be suppressed. Furthermore, it is desirable that the space portion 228 is formed at positions substantially orthogonal to the mounting surfaces 225 of the recording element substrates 3, which particularly require dimensional accuracy, since the heat is not easily transmitted to the mounting surfaces 225. In other words, it is desirable that the space portion 228 is provided at positions that at least partially overlaps the mounting surfaces 225 (the area in which the recording element substrates 3 are provided) when viewed in the direction orthogonal to the mounting surfaces 225.

Furthermore, in a case in which the space portion 228 is hollow when, in the fourth step, the molten resin is poured into the area surrounding the liquid supply path, a ceiling portion 229 illustrated in FIG. 9A may become deformed due to the pressure and heat of the molten resin and the resin may flow out to an undesired area. Accordingly, in the example embodiment, the deformation of the ceiling portion 229 is suppressed by maintaining the state in which the first slide piece 924 is inserted in the space portion 228 until the end of the fourth step. Furthermore, the first slide piece 924 has a cantilever structure and may be bent by the pressure of the molten resin in the fourth step. Accordingly, in the present example embodiment, in order to suppress bending of the slide piece 924 caused by the pressure of the molten resin, the through-hole portions 25 are provided so that the first slide piece 924 penetrates therethrough, and the leading edge of the first slide piece 924 is made to be in contact with the support portion 926. In FIGS. 10B and 11B, the support portion 926 protrudes from the surface of the mold 92. However, the configuration of the support portion is not limited to such a configuration and any configuration in which the leading edge portion of the first slide piece 924 and the support portion 926 contact each other may be adopted. In other words, it is only sufficient that the support portion 926 is disposed in the mold so as to counter the direction of the pressure of the molten resin in the fourth step. Note that in the example embodiment, the description has been given using a so-called serial scan liquid ejection head 1; however, the liquid ejection head according to the present disclosure may be of a full line type.

According to the present disclosure, a liquid ejection head having high dimensional accuracy that includes a recording element unit and a liquid flow path member can be manufactured.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-102831, filed May 29, 2018, which is hereby incorporated by reference herein in its entirety.

What is claimed is:

1. A method of manufacturing a liquid ejection head including a recording element substrate that ejects a liquid, and a liquid flow path member that includes a liquid supply path that supplies the liquid to the recording element substrate, in which the liquid flow path member includes a first portion that forms a portion of the liquid supply path, a second portion that includes a liquid supply path surface that forms another portion of the liquid supply path and a mounting surface on which the recording element substrate is mounted, and a sealing portion that seals an adjacent portion of the liquid supply path, the method of manufacturing the liquid ejection head comprising:

a first step of having a molten resin that is to become the first portion flow in between a first position in a first mold and a first position in a second mold and having a molten resin that is to become the second portion flow in between a second position in the first mold and a second position in the second mold;

a second step of relatively moving the first mold and the second mold so that the first portion of the first mold and the second portion of the second mold oppose each other, after opening the first mold and the second mold so that the first portion remains at the first position in the first mold and so that the second portion remains at the second position in the second mold;

a third step of closing the first mold and the second mold so that an area around a portion that is to become the liquid supply path in the first portion and an area around a portion that is to become the liquid supply path in the second portion contact each other;

a fourth step of joining the first portion and the second portion by having a molten resin that is to become the sealing portion flow into the adjacent portion of the area around the portion that is to become the liquid supply path in the first portion and the area around the portion that is to become the liquid supply path in the second portion in a state where a space portion different from the liquid supply path is formed between the liquid supply path surface and the mounting surface of the second portion, the space portion being formed between the liquid supply path surface and the mounting surface of the second portion at a position where the space portion overlaps at least the mounting surface and the sealing portion when viewed from a direction orthogonal to the mounting surface;

a fifth step of taking out the first portion, the second portion, and the sealing portion from the first mold and the second mold; and a sixth step of mounting the recording element substrate on the mounting surface of the second portion.

2. The method of manufacturing the liquid ejection head according to claim 1, wherein the step of forming the space portion is performed by inserting a slide piece, in the first step, into a portion that is to become the space portion, the slide piece configured to move relative to the first mold and the second mold.

3. The method of manufacturing the liquid ejection head according to claim 1, wherein the first mold or the second mold includes a support portion that extends in a direction that is substantially orthogonal to a direction in which the slide piece relatively moves, and the fourth step is performed while a portion of the slide piece is in contact with the support portion.

4. The method of manufacturing the liquid ejection head according to claim 1, wherein the slide piece is inserted in a portion that is to become the space portion in the second step to the fourth step.

5. The method of manufacturing the liquid ejection head according to claim 1, wherein a portion of one of the first portion and the second portion that forms the liquid supply path has a recessed shape and a portion of the other one of the first portion and the second portion that forms the liquid supply path has a protruded shape.

6. The method of manufacturing the liquid ejection head according to claim 1, wherein the molten resin that is to become the first portion and the molten resin that is to become the second portion in the first step, and the molten resin in the fourth step are of same material.

7. The method of manufacturing the liquid ejection head according to claim 1, wherein the molten resin in the first step contains an inorganic filler.

8. The method of manufacturing the liquid ejection head according to claim 1, wherein in the fourth step, with an inflow of the molten resin, at least portions of the first portion and the sealing portion are mixed with each other and at least portions of the second portion and the sealing portion are mixed with each other.

\* \* \* \* \*